(12) United States Patent
Uehara et al.

(10) Patent No.: US 10,352,396 B2
(45) Date of Patent: Jul. 16, 2019

(54) DAMPER DEVICE

(71) Applicant: EXEDY Corporation, Neyagawa-shi, Osaka (JP)

(72) Inventors: Hiroshi Uehara, Neyagawa (JP); Yoshinari Yoshimura, Neyagawa (JP); Takeshi Senoue, Neyagawa (JP)

(73) Assignee: EXEDY Corporation, Osaka (JP)

( * ) Notice: Subject to any disclaimer, the term of this patent is extended or adjusted under 35 U.S.C. 154(b) by 270 days.

(21) Appl. No.: 15/434,730

(22) Filed: Feb. 16, 2017

(65) Prior Publication Data

US 2017/0159745 A1 Jun. 8, 2017

Related U.S. Application Data

(63) Continuation-in-part of application No. 14/620,745, filed on Feb. 12, 2015, now abandoned.

(30) Foreign Application Priority Data

Feb. 27, 2014 (JP) ................................ 2014-037398

(51) Int. Cl.
*F16F 15/12* (2006.01)
*F16F 15/129* (2006.01)
*F16F 15/123* (2006.01)

(52) U.S. Cl.
CPC .... *F16F 15/1292* (2013.01); *F16F 15/12373* (2013.01)

(58) Field of Classification Search
CPC .................... F16F 15/1292; F16F 15/12373

USPC ....... 464/68.41; 192/213.12, 213.22, 213.31, 192/214.1
See application file for complete search history.

(56) References Cited

U.S. PATENT DOCUMENTS

| | | | |
|---|---|---|---|
| 4,406,357 A | 9/1983 | Nagano et al. | |
| 4,493,674 A | 1/1985 | Tamura et al. | |
| 4,496,036 A | 1/1985 | Liozeau | |
| 4,668,207 A | 5/1987 | Koshimo | |
| 4,684,007 A * | 8/1987 | Maucher | F16F 15/1238 192/213.22 |

(Continued)

FOREIGN PATENT DOCUMENTS

| | | |
|---|---|---|
| CN | 101305207 A | 11/2008 |
| CN | 101400920 A | 4/2009 |

(Continued)

*Primary Examiner* — Greg Binda
(74) *Attorney, Agent, or Firm* — Global IP Counselors, LLP

(57) ABSTRACT

A damper device includes a first rotary member, a second rotary member, a plurality of coil springs, an intermediate member and a slide spring. The first rotary member is a member into which a power of an engine is inputted. The second rotary member is disposed to be rotatable with respect to the first rotary member. The plurality of coil springs are configured to be compressed between the first rotary member and the second rotary member. The intermediate member is configured to engage the plurality of coil springs and couple the plurality of coil springs together. The slide spring is disposed axially between the first rotary member and the intermediate member. The slide spring is configured to slide against the first rotary member. The slide spring is configured not to slide with respect to the intermediate member.

8 Claims, 12 Drawing Sheets

(56) References Cited

U.S. PATENT DOCUMENTS

| | | | |
|---|---|---|---|
| 5,120,276 A * | 6/1992 | Maucher | F16F 15/13164 192/213.22 |
| 5,598,745 A | 2/1997 | Tsuchiya | |
| 8,795,092 B2 | 8/2014 | Verhoog | |

FOREIGN PATENT DOCUMENTS

| | | |
|---|---|---|
| EP | 2527681 A2 | 11/2012 |
| JP | 56-113845 A | 9/1981 |
| JP | 06-69504 U | 9/1994 |
| JP | 2012-159111 A | 8/2012 |
| WO | 2011-151570 A1 | 12/2011 |

* cited by examiner ated Japanese Patent Application No. 2014-37398 and U.S. patent application Ser. No. 14/620,745 are hereby incorporated by reference.

DAMPER DEVICE

CROSS-REFERENCE TO RELATED APPLICATIONS

This application is a continuation-in-part of U.S. patent application Ser. No. 14/620,745, filed on Feb. 12, 2015, now abandoned, which claims priority under 35 U.S.C. § 119(a) to Japanese Patent Application No. JP2014-37398 filed on Feb. 27, 2014, the entire disclosures of Japanese Patent Application No. 2014-37398 and U.S. patent application Ser. No. 14/620,745 are hereby incorporated by reference.

BACKGROUND

Field of Invention

The present invention relates to a damper device.

Background Information

Various devices are installed in a drivetrain of a vehicle to transmit power generated in an engine to a transmission. A damper device and a flywheel assembly can be exemplified as these types of devices. Damper devices are used for these devices to attenuate rotary vibrations (see Japan Laid-open Patent Application Publication No. JP-A-2012-159111).

The aforementioned damper device mainly includes an input-side rotary member (a first side plate and a second side plate), an output-side rotary member (a center plate), a plurality of coil springs to be compressed between the first side plate and the center plate, and an intermediate plate for coupling the coil springs.

In the aforementioned damper device, the output-side rotary member has spring receiving parts. Further, the intermediate plate is disposed on the outer peripheral side and has spring receiving parts. Furthermore, the spring receiving parts of the output-side rotary member and those of the intermediate plate are disposed to be aligned in the circumferential direction. On the other hand, another type of damper device is similar to the aforementioned damper device, but has a construction that the intermediate plate is disposed on the inner peripheral side and the spring receiving parts of the output-side rotary member and those of the intermediate plate are disposed to be aligned in the circumferential direction.

It has been commonly known that a member for actively generating slide resistance is disposed in the damper device. A wave spring is exemplified as this member. In the construction, for instance, the wave spring is disposed axially between the input-side rotary member and the intermediate plate, and thus, slide resistance is generated between the wave spring and both of the input-side rotary member and the intermediate plate.

However, in the latter type of damper device in which the intermediate plate is disposed on the inner peripheral side, when the damper device is activated, the wave spring is inevitably rotated between the input-side rotary member and the intermediate plate. This is because in the latter type of damper device, the spring receiving parts of the output-side rotary member and those of the intermediate plate are disposed to be aligned in the circumferential direction. In the construction, hills of the wave spring are inevitably located between the input-side rotary member and the intermediate plate. Hence, stable slide resistance cannot be reliably generated.

SUMMARY

It is an object of the present invention to stably generate slide resistance of a damper device.

A damper device according to a first exemplary embodiment of the present invention includes a first rotary member, a second rotary member, a plurality of coil springs, an intermediate member and a slide spring. The first rotary member is a member into which a power of an engine is inputted. The second rotary member is disposed to be rotatable with respect to the first rotary member. The plurality of coil springs are configured to be compressed between the first rotary member and the second rotary member. The intermediate member is configured to engage the plurality of coil springs and couple the coil springs. The slide spring is disposed axially between the first rotary member and the intermediate member. Further, the slide spring is configured to slide against the first rotary member. Yet further, the slide spring is configured not to slide, or retain its position, on the intermediate member.

In the present damper device, when inputted into the first rotary member, the power of the engine is sequentially transmitted to the first rotary member, the intermediate member and the second rotary member in this order. In the power transmission path, the plurality of coil springs are configured to be compressed between the first rotary member and the second rotary member through the intermediate member. Further, the slide spring is configured to slide against the first rotary member while being positioned on the intermediate member.

According to the present damper device, the slide spring is configured to slide against the first rotary member while being positioned on the intermediate member. Put differently, the intermediate member generates slide resistance between itself and the first rotary member, while being restricted from circumferentially moving. Thus, the present damper device can stably generate slide resistance.

A damper device according to a second exemplary embodiment of the present invention relates to the damper device of the first exemplary embodiment, and wherein the second rotary member has a first body and a pressing part. The first body is disposed on an inner peripheral side of the coil springs. The pressing part extends radially outward from the first body and is capable of pressing the coil springs. Further, the intermediate member has a second body and an engaging part. The second body is disposed on the inner peripheral side of the coil springs. The engaging part extends radially outward from the second body and is configured to engage with the respective coil springs. Herein, the pressing part and the engaging part are disposed to be circumferentially aligned. Yet further, the slide spring is disposed axially between the first rotary member and both of the pressing part and the engaging part.

In the present damper device, the slide spring is positioned on the intermediate member. Thus, slide resistance can be stably generated between the slide spring and the first rotary member even when the pressing part of the second rotary member and the engaging part of the intermediate member are disposed to be circumferentially aligned, and further, the slide spring is disposed between the first rotary member and both of the pressing part and the engaging part.

A damper device according to a third exemplary embodiment of the present invention relates to the damper device of the first or second exemplary embodiment, and wherein the intermediate member has a protruding part protruding toward the first rotary member. Further, the slide spring has a spring part and a restriction part. The spring part is configured to make contact with the first rotary member and the intermediate member. The restriction part is configured to engage with the protruding part and restricts circumferential movement of the slide spring.

In the present damper device, the spring part makes contact with the first rotary member and the intermediate member. Thus, the intermediate member can be axially positioned with respect to the first rotary member. Further, the restriction part is engaged with the intermediate member and restricts circumferential movement of the slide spring. Thus, slide resistance can be stably generated between the spring part and the first rotary member.

A damper device according to a fourth exemplary embodiment of the present invention relates to the damper device of the third exemplary embodiment, and wherein the slide spring is a wave spring. Further, the spring part has a first convex part and a second convex part. The first convex part contacts the first rotary member. The second convex part is disposed circumferentially adjacent to the first convex part and contacts the intermediate member.

In the present damper device, the first convex part of the wave spring contacts the first rotary member, whereas the second convex part of the wave spring contacts the intermediate member. Thus, even when the intermediate member is axially moved due to variation in torque or so forth, the intermediate member can be axially positioned with respect to the first rotary member by the wave spring.

Further, the wave spring can maintain a condition that the first convex part thereof always makes contact with the first rotary member. Thus, slide resistance can be stably generated between the wave spring and the first rotary member.

A damper device according to a fifth exemplary embodiment of the present invention relates to the damper device of the third or fourth exemplary embodiment, and wherein the protruding part is an embossed part formed by embossing the intermediate member.

In the present damper device, the protruding part is formed by embossing. Thus, the protruding part can be easily formed, and further, can reliably exert required stiffness.

Overall, according to the present invention, slide resistance of a damper device can be stably generated.

BRIEF DESCRIPTION OF THE DRAWINGS

Referring now to the attached drawings which form a part of this original disclosure.

DETAILED DESCRIPTION OF EXEMPLARY EMBODIMENTS

<Entire Construction>

Figure 1:
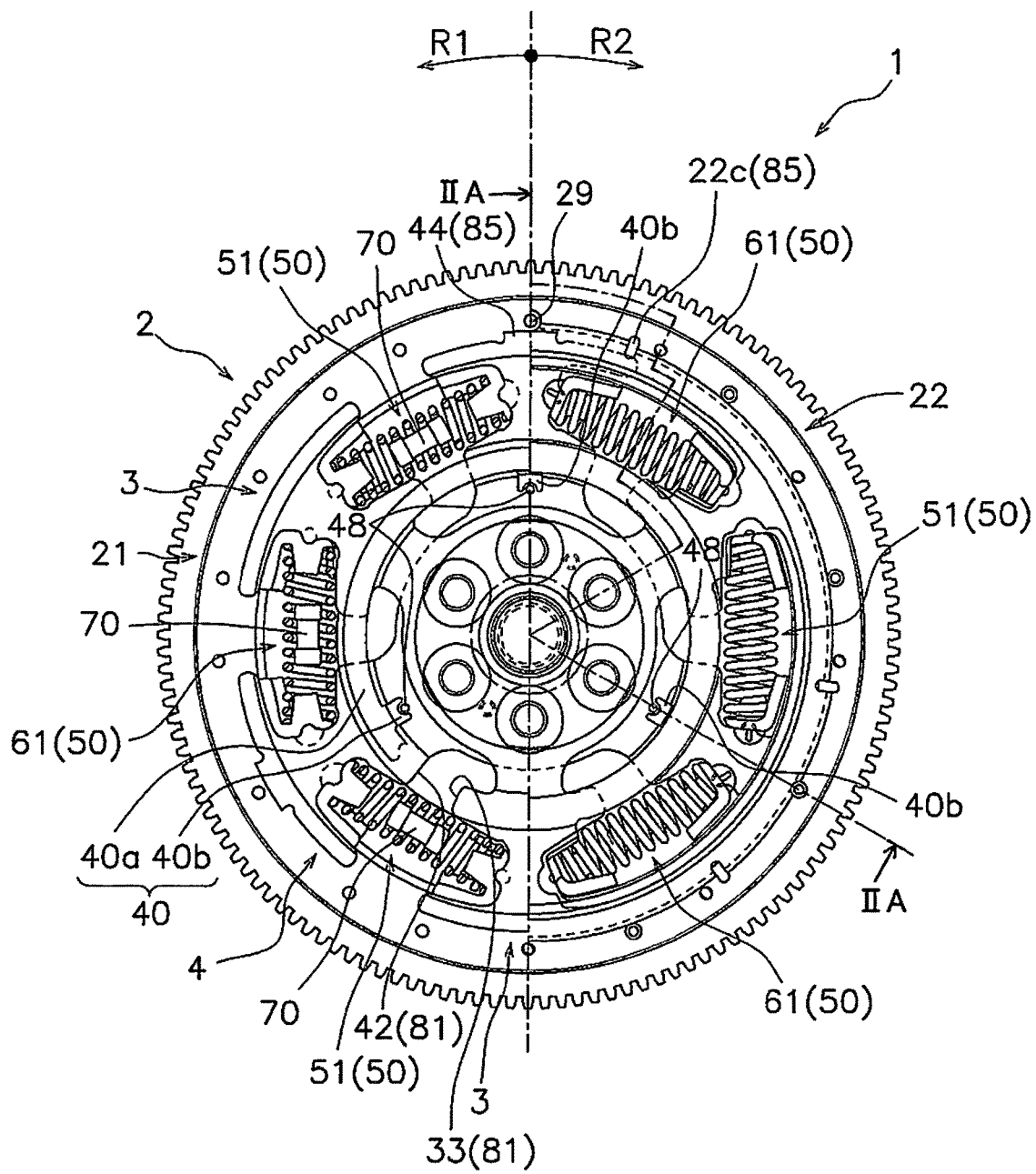
FIG. 1 is a side view of a flywheel assembly according to a first exemplary embodiment.

A flywheel assembly 1 (an exemplary damper device) according to a first exemplary embodiment will be hereinafter explained with reference to FIGS. 1 to 8B. The flywheel assembly 1 is a device for transmitting power generated by an engine to a transmission.

As shown in FIG. 1, FIG. 2A, and FIGS. 5 to 8B, the flywheel assembly 1 includes an input plate 2 (an exemplary first rotary member), an output plate 3 (an exemplary second rotary member), a plurality of coil springs 50, a support plate 4 (an exemplary intermediate member), a first stopper mechanism 81, a second stopper mechanism 85, shock absorber members 70 and a wave spring 40 (an exemplary slide spring). It should be noted that the plurality of coil springs 50 are composed of, for example, three groups of coil springs 50. Each group of coil springs 50 is composed of a pair (two) of coil springs 50. In the following explanation, one of each pair of coil springs 50 will be referred to as a first coil spring 51, whereas the other of each pair of coil springs 50 will be referred to as a second coil spring 61.

<Input Plate>

Power of the engine is inputted into the input plate 2. Put differently, the input plate 2 is a member into which power generated by the engine is inputted. The input plate 2 is disposed on an engine side. The input plate 2 is fixed to a crankshaft (not shown in the drawings) of the engine.

Figure 2A:
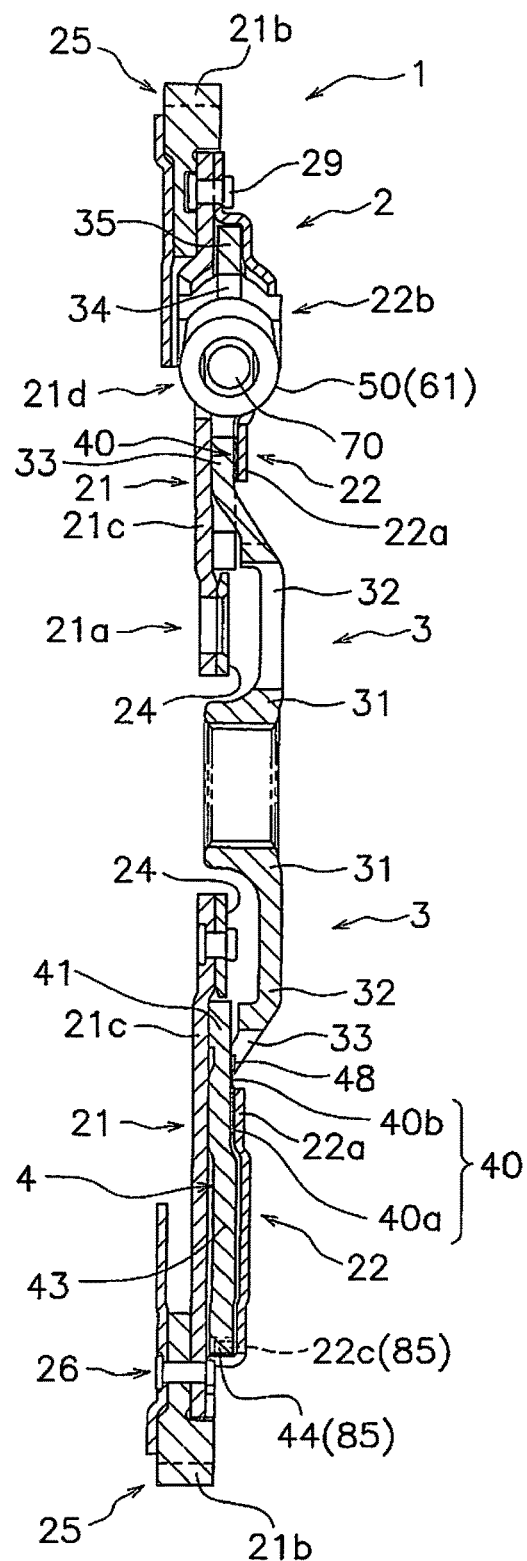
FIG. 2A is a cross-sectional view of FIG. 1 taken along a cutaway line IIA-IIA.
Figure 5:
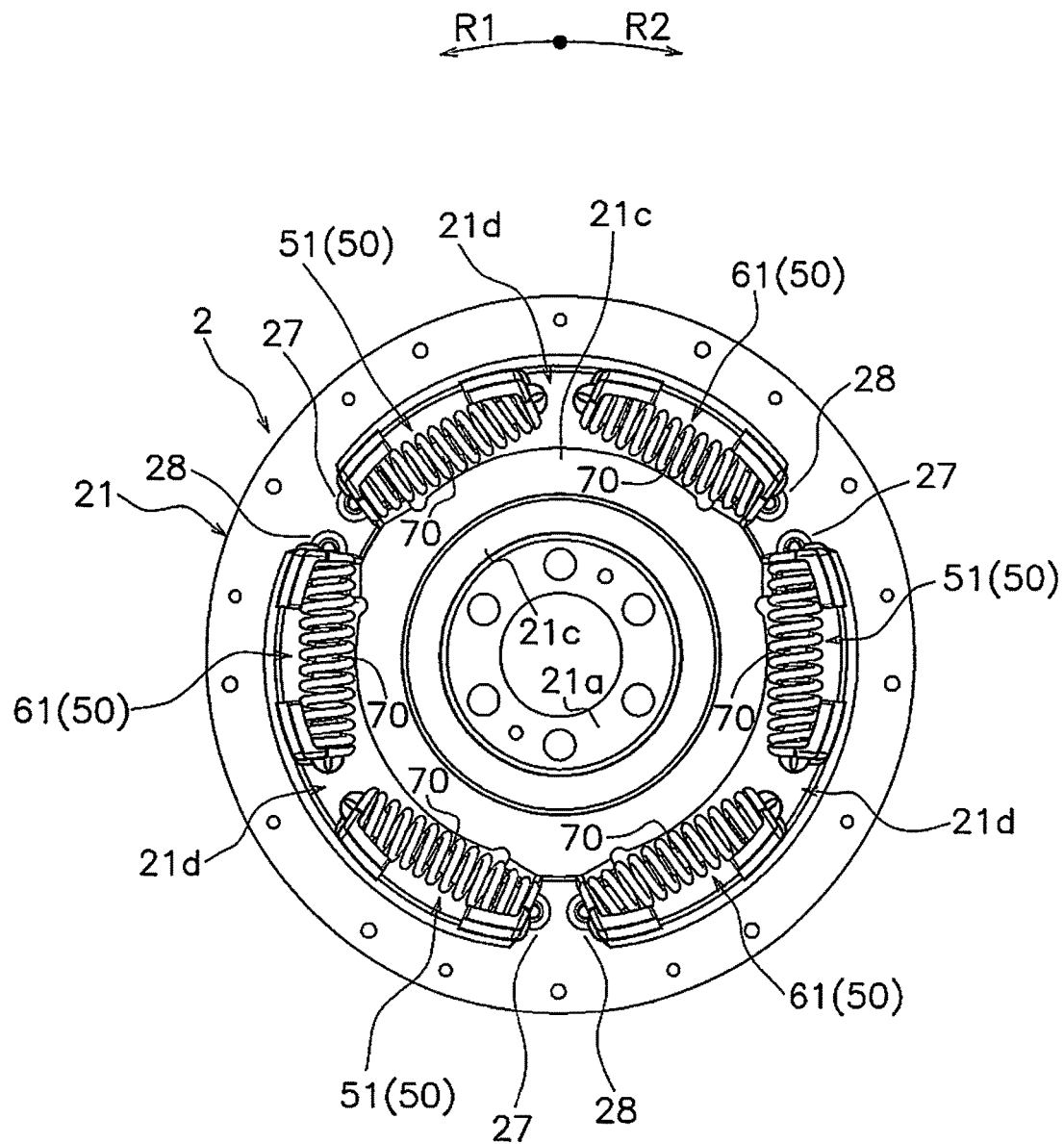
FIG. 5 is a side view of a first plate with coil springs.

As shown in FIG. 1, FIG. 2A, and FIGS. 5 and 6, the input plate 2 includes a first plate 21 and a second plate 22. As shown in FIG. 2A, the first plate 21 is disposed on the engine side. As shown in FIG. 2A, and FIG. 5, the first plate 21 has coupling parts 21a on the inner peripheral part thereof to couple the first plate 21 to the engine.

As shown in FIG. 2A, a reinforcement member 24 is mounted to the coupling parts 21a in order to reinforce the coupling parts 21a. For example, the coupling parts 21a are apertures, whereas the reinforcement member 24 is a spacer. Fixture members, such as fixture bolts (not shown in the drawings) or rivets, are inserted through the apertures 21a. When described in detail, the fixture bolts or rivets are inserted through the apertures 21a, while the spacer 24 is disposed between the apertures 21a and the head parts of the fixture bolts or rivets. The first plate 21 is thus fixed to the crankshaft of the engine.

As shown in FIG. 2A, the outer peripheral part of the first plate 21 is fixed to the second plate 22 by fixture members, such as rivets 29. The first plate 21 is thereby unitarily rotatable with the second plate 22. Further, a ring member 25 is fixed to the outer peripheral part of the first plate 21 by fixture members, such as rivets 26. The ring member 25 has a serrated part 21b formed on the outer peripheral part thereof to initiate an action of the input plate 2 (the rust plate 21). It should be noted that the serrated part 21b may be integrally formed on the outer peripheral part of the first plate 21 without using the ring member 25.

As shown in FIG. 5, the first plate 21 has a disc-shaped body 21c and a plurality of window parts 21d. The disc-shaped body 21c has an aperture bored in the inner peripheral part thereof. The plurality (e.g., three) of window parts 21d are bored in the body 21c. When described in detail, the plurality (e.g., three) of window parts 21d are bored in the body 21c to be circumferentially aligned at predetermined intervals. Each window part 21d accommodates one pair of coil springs 50 (e.g., the first coil spring 51 and the second coil spring 61). One end of the first coil spring 51 contacts one circumferential end of each window part 21d through one spring sheet. On the other hand, one end of the second coil spring 61 contacts the other circumferential end of each window part 21d through another spring sheet.

As shown in FIG. 2A, the second plate 22 is disposed on the transmission side to be opposed to the first plate 21. When described in detail, the second plate 22 is disposed axially away from the first plate 21 at a predetermined interval. The outer peripheral part of the second plate 22 is fixed to the first plate 21 by the fixture members, such as the rivets 29. Thus, the second plate 22 is unitarily rotatable with the first plate 21.

Figure 6:
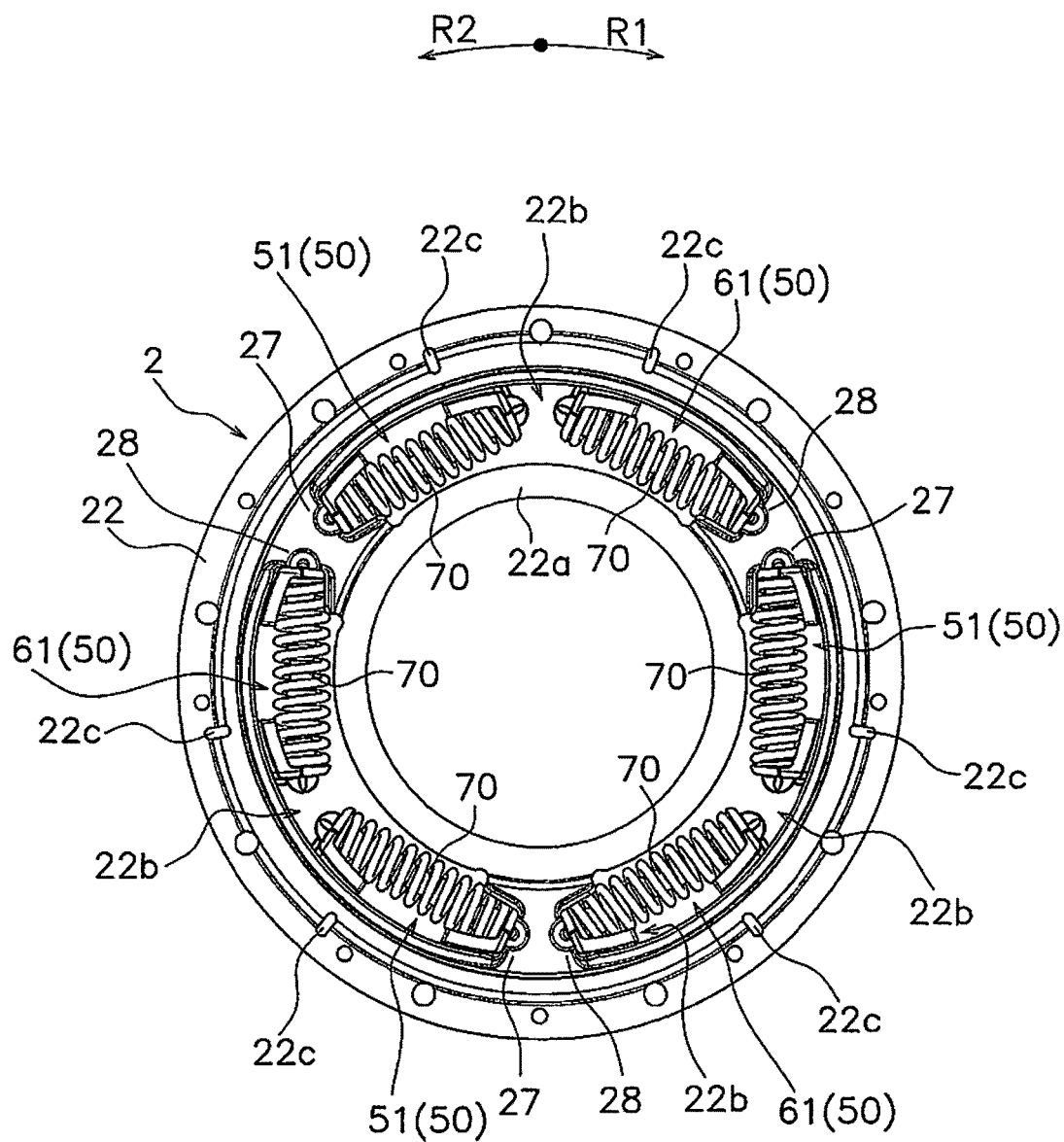
FIG. 6 is a side view of a second plate with coil springs.

As shown in FIG. 6, the second plate 22 has a disc-shaped body 22a, a plurality of window parts 22b and a plurality of first protruding parts 22c. The disc-shaped body 22a has an aperture in the inner peripheral part thereof. The plurality (e.g., three) of window parts 22b are bored in the body 22a. When described in detail, the plurality of window parts 22b are bored therein to be circumferentially aligned at predetermined intervals. The plurality of window parts 22b are respectively disposed to be axially opposed to the window parts 21d of the first plate 21. The one end of the first coil spring 51 contacts one circumferential end of each window part 22b through the aforementioned one spring sheet. On the other hand, the one end of the second coil spring 61 contacts the other circumferential end of each window part 22b through the aforementioned another spring sheet.

As shown in FIG. 2A, the plurality of first protruding parts 22c protrude from a plane on which the body 22a is arranged. When described in detail, the plurality of first protruding parts 22c are located on the outer peripheral part of the body 22a and protrude toward the first plate 21. Specifically, the plurality of first protruding parts 22c are formed by partially bending the outer peripheral part of the body 22a, and are thus integrally formed with the body 22a. As shown in FIG. 6, the plurality (e.g., six) of first protruding parts 22c are located in the circumferential direction. When described in detail, a plurality of (e.g., three) pairs of first protruding parts 22c are respectively located in a plurality of (three) positions to be circumferentially aligned at predetermined intervals. Each of rotation restriction parts 44 (to be described) of the support plate 4 is disposed between each pair of first protruding parts 22c.

The first protruding parts 22c are disposed on the outer peripheral side of the outer peripheral part (e.g., engaging parts 43 to be described; in detail, second extension parts 45) of the support plate 4. Further, each first protruding part 22c is contactable to the outer peripheral part (relevant one of the rotation restriction parts 44 to be described; see FIG. 1, FIG. 2A, and FIG. 7A) of the support plate 4.

As shown in FIG. 5 and FIG. 6, the one end of each first coil spring 51 contacts the one end of each pair of opposed window parts 21d and 22b of the first and second plates 21 and 22 through the aforementioned one spring sheet. On the other hand, the one end of each second coil spring 61 contacts the other end of each pair of opposed window parts 21d and 22b of the first and second plates 21 and 22 through the aforementioned another spring sheet. In the following explanation, the one end of each pair of window parts 21d and 22b to be contacted to each first coil spring 51 will be referred to as "a first pressing part 27", whereas the other end of each pair of window parts 21d and 22b to be contacted to each second coil spring 61 will be referred to as "a second pressing part 28".

<Output Plate>

The output plate 3 outputs the power of the engine to the transmission. The output plate 3 is disposed to be rotatable with respect to the input plate 2. The output plate 3 is fixed to an output shaft (not shown in the drawings) coupled to the transmission.

Figure 7A:
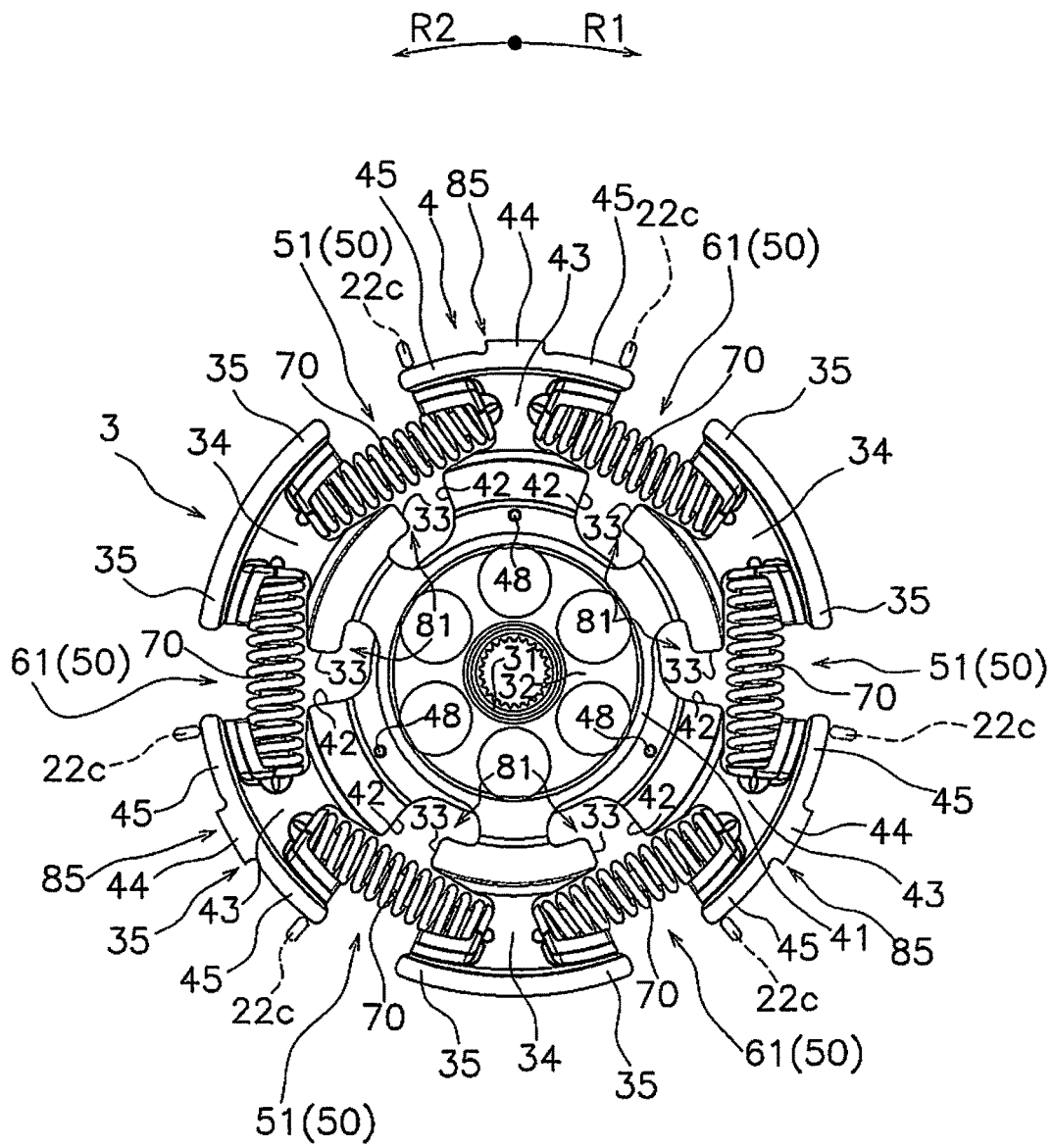
FIG. 7A is a side view of an output plate and a support plate with coil springs.
Figure 7B:
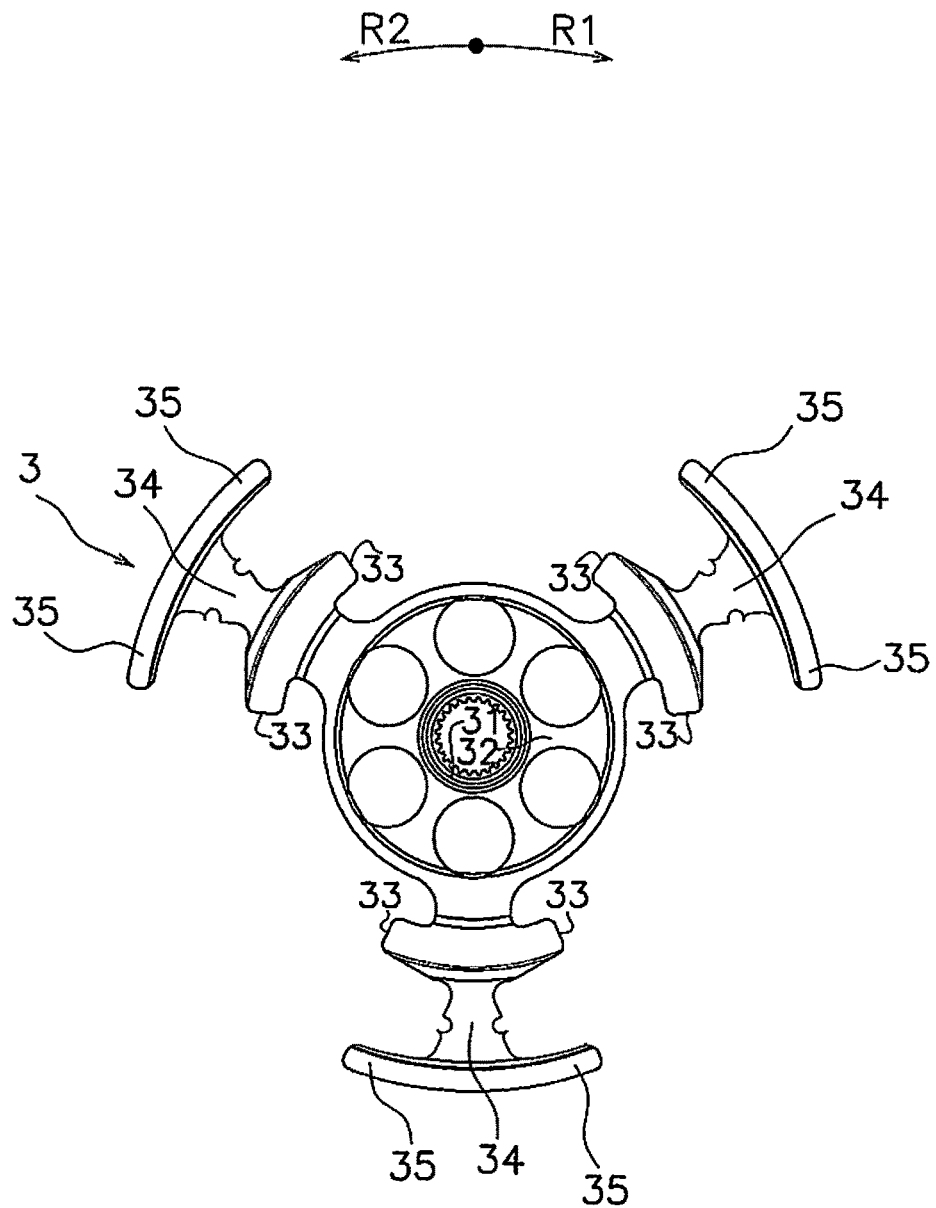
FIG. 7B is a side view of the output plate.

As shown in FIG. 1, FIG. 2A, FIG. 7A and FIG. 7B, the output plate 3 has a cylindrical part 31, an annular part 32 (an exemplary first body), first contact parts 33 and third pressing parts 34 (exemplary pressing parts). The cylindrical part 31 is fixed to the output shaft (not shown in the drawings) coupled to the transmission. As shown in FIGS. 2A, 7A and FIG. 7B, the annular part 32 is integrally formed with the outer periphery of the cylindrical part 31. The first contact parts 33 are formed on the outer peripheral part of the annular part 32. The first contact parts 33 are contactable to the support plate 4 (second contact parts 42 to be described).

As shown in FIGS. 7A and 7B, each third pressing part 34 presses at least either of one first coil spring 51 and one second coil spring 61. The third pressing parts 34 extend radially outward from the annular part 32 and are integrally formed with the annular part 32. Further, a first extension part 35 is formed on the outer peripheral part of each third pressing part 34 to extend in the circumferential direction. The first extension part 35 is disposed on the outer peripheral side of the first coil spring 51 and the second coil spring 61. Specifically, the first extension part 35 is disposed on the outer peripheral side of one end of the first coil spring 51 through one spring sheet, while being disposed on the outer peripheral side of one end of the second coil spring 61 through another spring sheet. With the construction, the first extension part 35 restricts the first coil spring 51 and the second coil spring 61 from moving to the outer peripheral side.

<Support Plate>

As shown in FIG. 7A, the support plate 4 is engaged with the first coil springs 51 and the second coil springs 61. The support plate 4 couples each pair of the first coil spring 51 and the second coil spring 61 in series.

As shown in FIG. 2A and FIGS. 7A-7C, The support plate 4 has an annular body 41 (an exemplary second body), the second contact parts 42, the engaging parts 43, the rotation restriction parts 44 and second protruding parts 48 (exemplary protruding parts). The body 41 is disposed on the inner peripheral side of the first coil springs 51 and the second coil springs 61. The second contact parts 42 are formed on the outer peripheral part of the body 41. The second contact parts 42 are contactable to the output plate 3. When described in detail, the second contact parts 42 are respectively disposed to be circumferentially opposed to the first contact parts 33 of the output plate 3. The second contact parts 42 are respectively contactable to the opposed first contact parts 33 of the output plate 3.

Figure 7C:
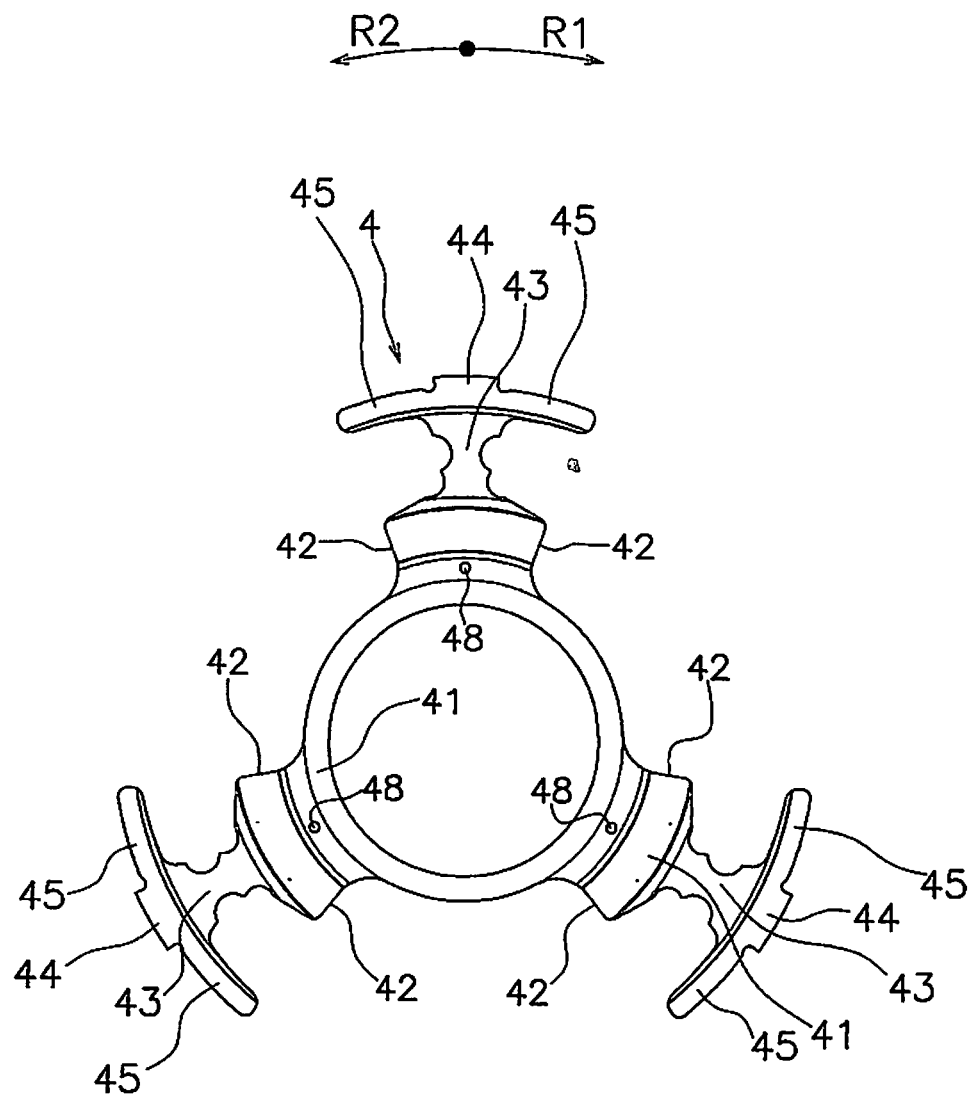
FIG. 7C is a side view of the support plate.

As shown in FIGS. 7A-7C, each engaging part 43 is disposed between one first coil spring 51 and one second coil spring 61. Each engaging part 43 is engaged with one end of the first coil spring 51 and that of the second coil spring 61. When described in detail, each engaging part 43 is engaged with one end of the first coil spring 51 though one spring sheet, while being engaged with one end of the second coil spring 61 through another spring sheet. The engaging parts 43 extend radially outward from the body 41 and are integrally formed with the body 41. The engaging parts 43 and the third pressing parts 34 of the output plate 3 are disposed to be alternately aligned in the circumferential direction.

Further, as shown in FIGS. 7A-7C, each second extension part 45 is formed on the outer peripheral part of each engaging part 43 to extend in the circumferential direction. Each second extension part 45 is disposed on the outer peripheral side of the first coil spring 51 and the second coil spring 61. Specifically, each second extension part 45 is disposed on the outer peripheral side of the one end of the first coil spring 51 through the aforementioned one spring sheet, while being disposed on the outer peripheral side of the one end of the second coil spring 61 through the aforementioned another spring sheet. Thus, each second extension part 45 restricts the first coil spring 51 and the second coil spring 61 from moving to the outer peripheral side.

The rotation restriction parts 44 serve to restrict rotation of the support plate 4. As shown in FIG. 7C, each rotation restriction part 44 is formed on each engaging part 43. When described in detail, each rotation restriction part 44 protrudes radially outward from each engaging part 43 and is integrally formed with each engaging part 43. Each rotation restriction part 44 is disposed between one pair of first protruding parts 22c (see FIG. 7A). Each rotation restriction part 44 is contactable to one of the pair of first protruding parts 22c of the input plate 2. The rotation restriction parts 44 restrict rotation of the support plate 4 by contacting ones of the pairs of first protruding parts 22c of the input plate 2.

Figure 2B:
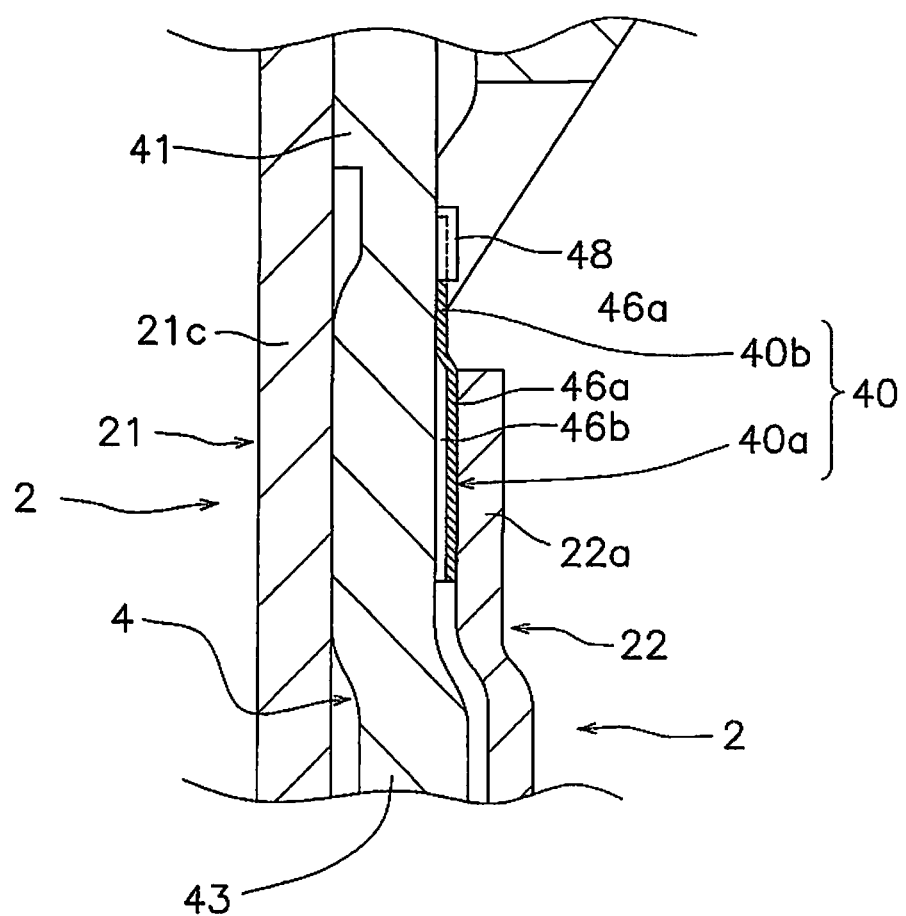
FIG. 2B is an partially enlarged cross-sectional view of FIG. 2A.
Figure 3A:
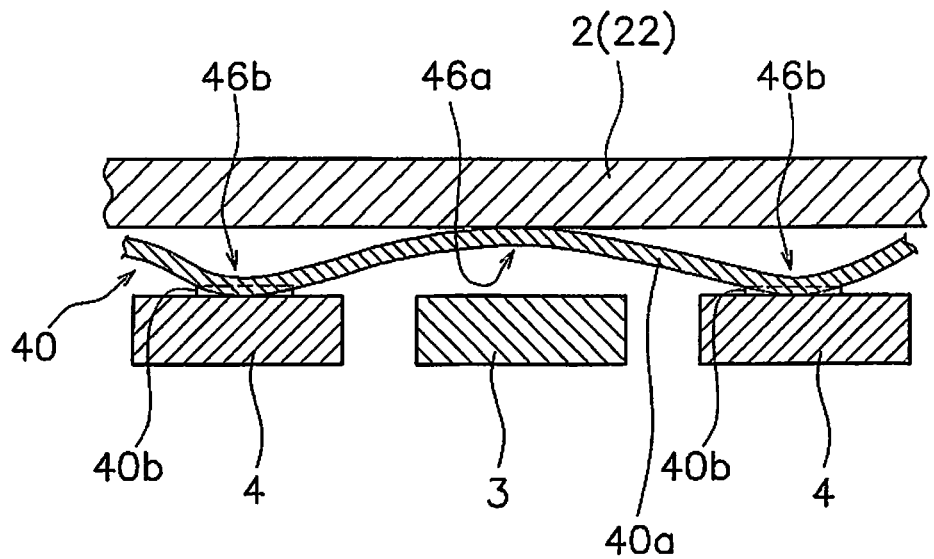
FIG. 3A is a schematic diagram for explaining a contact state of a wave spring when the wave spring is viewed from the outside in the radial direction.
Figure 3B:
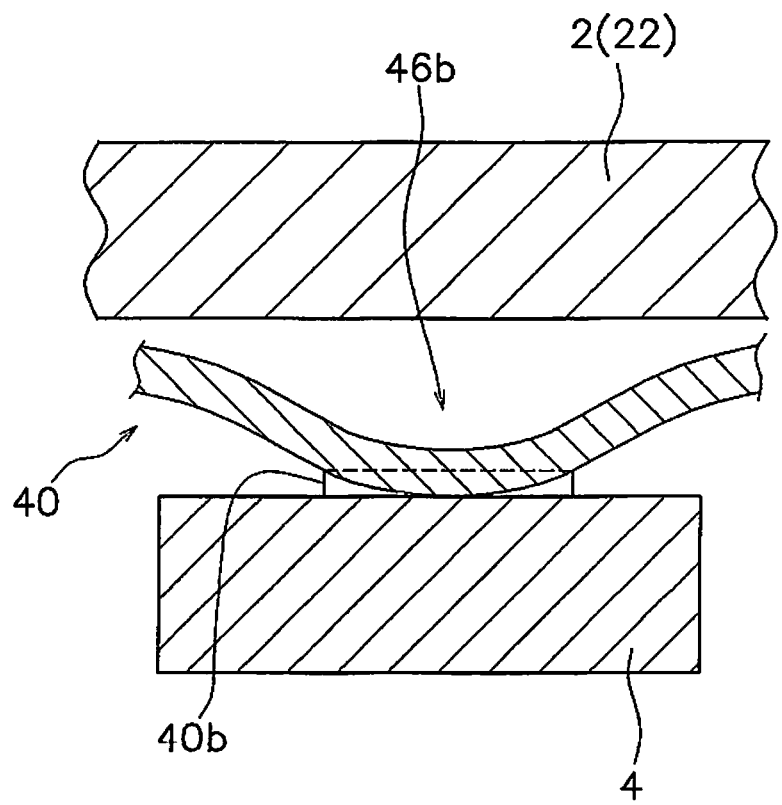
FIG. 3B is a partially enlarged schematic diagram of FIG. 3A.
Figure 8A:
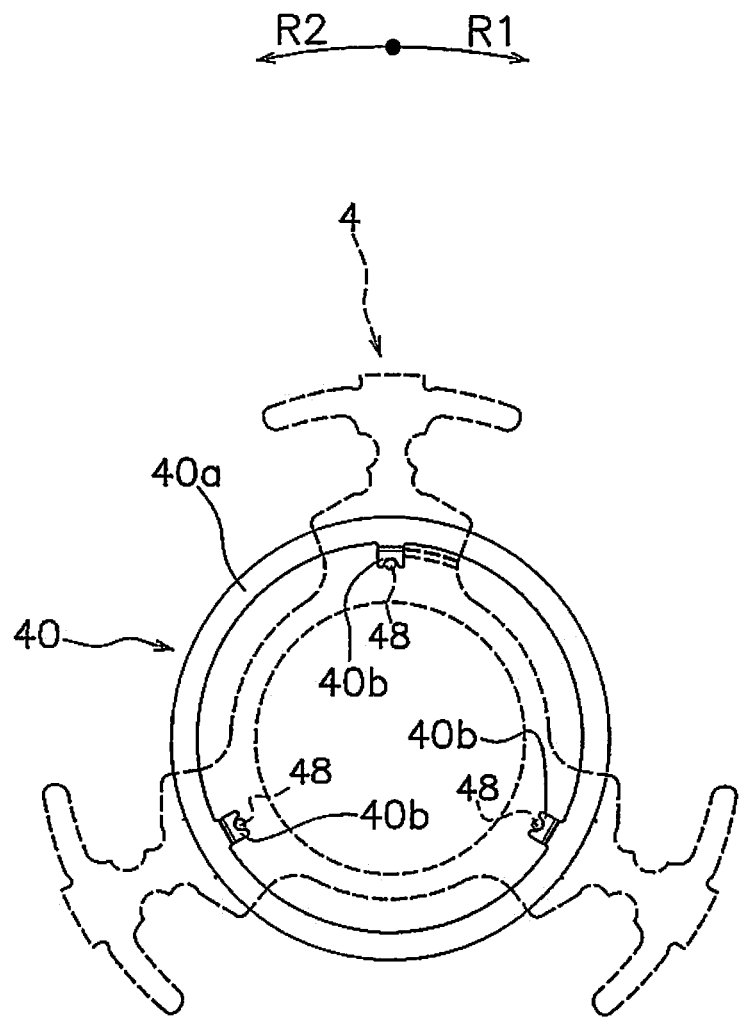
FIG. 8A is a side view of wave spring with the support plate.

As shown in FIGS. 2B and 3B, the second protruding parts 48 protrude toward the transmission, e.g., a side of the input plate 2. Specifically, the second protruding parts 48 protrude from the body 41 toward the second plate 22. As shown in FIG. 7C, the plurality (e.g., three) of second protruding parts 48 are herein integrally formed with the body 41 to be circumferentially aligned at predetermined intervals. As shown in FIG. 8A, the wave spring 40 (restriction parts 40b to be described) is engaged with the second protruding parts 48. The second protruding parts 48 are formed by embossing the body 41 of the support plate 4. In other words, the second protruding parts 48 are embossed parts.

<Coil Springs>

As shown in FIG. 1 and FIGS. 5 to 7A, the plurality of coil springs 50 are composed of, for instance, three groups of coil springs. One group of coil springs is composed of a pair of (two) coil springs, for exemplary, the first coil spring 51 and the second coil spring 61. In each pair of the coil springs 51 and 61, the first coil spring 51 and the second coil spring 61 are configured to be activated in series.

As shown in FIG. 1 and FIGS. 5 to 7A, the first coil springs 51 are configured to be circumferentially compressed between the input plate 2 and the output plate 3. When described in detail, as shown in FIGS. 5 to 7A, each first coil spring 51 is configured to be compressed between each first pressing part 27 of the first and second plates 21 and 22 and each third pressing part 34 of the output plate 3. When described in more detail, each first coil spring 51 is configured to be compressed between each first pressing part 27 of the first and second plates 21 and 22 and each engaging part 43 of the support plate 4. Each first coil spring 51 is also configured to be compressed between each third pressing part 34 of the output plate 3 and each engaging part 43 of the support plate 4. Yet further, in each pair of the coil springs 51 and 61, the first coil spring 51 is disposed in series with the second coil spring 61. When described in detail, the first coil spring 51 is disposed in series with the second coil spring 61 through the support plate 4.

As shown in FIG. 1 and FIGS. 5 to 7A, the second coil springs 61 are configured to be circumferentially compressed between the input plate 2 and the output plate 3. When described in detail, as shown in FIGS. 5 to 7A, each second coil spring 61 is configured to be compressed between each second pressing part 28 of the first and second plates 21 and 22 and each third pressing part 34 of the output plate 3. When described in detail, each second coil spring 61 is configured to be compressed between each second pressing part 28 of the first and second plates 21 and 22 and each engaging part 43 of the support plate 4. Each second coil spring 61 is also configured to be compressed between each third pressing part 34 of the output plate 3 and each engaging part 43 of the support plate 4. In each pair of the coil springs 51 and 61, the second coil spring 61 is disposed in series with the first coil spring 51. When described in detail, the second coil spring 61 is disposed in series with the first coil spring 51 through the support plate 4.

<First Stopper Mechanism>

The first stopper mechanism 81 is configured to deactivate the first coil springs 51 and the second coil springs 61 by causing the support plate 4 and the output plate 3 to contact each other.

When described in detail, the first stopper mechanism 81 is configured to deactivate the first coil springs 51 and the second coil springs 61 by causing the inner peripheral part of the support plate 4 and that of the output plate 3 to contact each other.

When described in more detail, as shown in FIGS. 1 and 7A, the first stopper mechanism 81 is composed of the first contact parts 33 of the output plate 3 and the second contact parts 42 of the support plate 4. In the first stopper mechanism 81, when the input plate 2 is rotated in a first direction (an R1 direction in FIG. 1), the second contact part 42 of the support plate 4, which is disposed on the inner peripheral side of each first coil spring 51, makes contact with its opposed first contact part 33 of the output plate 3. Accordingly, the first coil springs 51 and the second coil springs 61 are configured to be deactivated. Contrarily, when the input plate 2 is rotated in a second direction (an R2 direction in FIG. 1), the second contact part 42 of the support plate 4, which is disposed on the inner peripheral side of each second coil spring 61, makes contact with its opposed first contact part 33 of the output plate 3. Accordingly, the first coil springs 51 and the second coil springs 61 are configured to be deactivated.

It should be noted that when the first coil springs 51 and the second coil springs 61 are deactivated (become incompressible), the first stopper mechanism 81 and the second stopper mechanism 85 (to be described) are configured to be simultaneously activated.

<Second Stopper Mechanism>

The second stopper mechanism 85 is configured to deactivate the first coil springs 51 and the second coil springs 61 by causing the input plate 2 and the support plate 4 to make contact with each other. A torsion angle at which the second stopper mechanism 85 is activated is the same as a torsion angle at which the first stopper mechanism 81 is activated. In other words, the second stopper mechanism 85 is configured to be simultaneously activated with the first stopper mechanism 81.

When described in detail, the second stopper mechanism 85 is configured to deactivate the first coil springs 51 and the second coil springs 61 by causing the outer peripheral part of the second plate 22 and that of the support plate 4 to contact each other.

When described in detail, as shown in FIGS. 1, 6, 7A and 7C, the second stopper mechanism 85 is composed of the first protruding parts 22c of the second plate 22 and the rotation restriction parts 44 of the support plate 4. In the second stopper mechanism 85, when the input plate 2 is rotated in the first direction (the R1 direction in FIG. 1), the first protruding part 22c of the second plate 22, which is disposed on the outer peripheral side of each second coil spring 61, contact each rotation restriction part 44 of the support plate 4. Accordingly, the first coil springs 51 and the second coil springs 61 are configured to be deactivated. It should be noted that when the input plate 2 is rotated in the second direction (the R2 direction in FIG. 1), the first protruding part 22c of the second plate 22, which is disposed on the outer peripheral side of each first coil spring 51, contacts each rotation restriction part 44 of the support plate 4. Accordingly, the first coil springs 51 and the second coil springs 61 are configured to be deactivated similarly to when the input plate 2 is rotated in the first direction (the R1 direction in FIG. 1).

It should be noted that when the first coil springs 51 and the second coil springs 61 are deactivated (become incompressible), the first stopper mechanism 81 and the second stopper mechanism 85 are configured to be simultaneously activated.

<Shock Absorber Member>

As shown in FIG. 1 and FIGS. 5 to 7A, the shock absorber members 70 are movably disposed inside the first coil springs 51 and the second coil springs 61. The shock absorber members 70 are elastic members. Specifically, the shock absorber members 70 are elastic members made of resin. The shock absorber members 70 are capable of relieving activation of the first stopper mechanism 81 and that of the second stopper mechanism 85 during activation of the first coil springs 51 and the second coil springs 61. Further, when the shock absorber members 70 are activated, the torsional stiffness of each first coil spring 51 and/or that of each second coil spring 61 are/is increased. It should be noted that in the following explanation, the term "torsion angle" may be used as a meaning of "an absolute value of torsion angle".

In detail, the shock absorber members 70 become compressible inside the first coil springs 51 and the second coil springs 61 when a torsion angle θ (an exemplary rotary angle) of the output plate 3 relative to the input plate 2 becomes a predetermined first angle θ1 (see FIG. 4) or greater. The predetermined first angle θ1 is less than a torsion angle θ2 (see FIG. 4) at which the first stopper mechanism 81 and the second stopper mechanism 85 are activated.

In more detail, the shock absorber members 70 become compressible between the support plate 4 and the output plate 3 when the torsion angle θ of the output plate 3 relative to the input plate 2 is greater than or equal to the predetermined first angle θ1 and less than the torsion angle θ2 at which the first stopper mechanism 81 and the second stopper mechanism 85 are activated. For example, the shock absorber member 70, disposed inside each first coil spring 51, is compressible between the first pressing part 27 of the first and second plates 21 and 22 and the engaging part 43 of the support plate 4. On the other hand, the shock absorber member 70, disposed inside each second coil spring 61, is compressible between the engaging part 43 of the support plate 4 and the third pressing part 34 of the output plate 3.

It should be noted that the predetermined first angle θ1 is less than the torsion angle θ2 at which the first stopper mechanism 81 and the second stopper mechanism 85 are activated.

When large torque is abruptly inputted into the input plate 2 under the aforementioned condition, the shock absorber members 70 hinder the first stopper mechanism 81 and the second stopper mechanism 85 from being activated. Further, in activation of the first stopper mechanism 81 and the second stopper mechanism 85, the shock absorber members 70 also lessen activation sound of the first stopper mechanism 81 and the second stopper mechanism 85.

<Wave Spring>

The wave spring 40 is configured to generate slide resistance by sliding against a member disposed axially adjacent thereto. As shown in FIG. 2A, FIG. 2B, FIG. 3A and FIG. 3B, the wave spring 40 is disposed axially between the input plate 2 and the support plate 4. Specifically, as shown in FIG. 2B and FIG. 3A, the wave spring 40 is disposed axially between the input plate 2 (the second plate 22) and the support plate 4.

Further, as shown in FIG. 1, FIG. 2B, FIG. 3B, and FIG. 8A, the wave spring 40 is positioned on the support plate 4. Therefore, the wave spring 40 slides against the input plate 2 (e.g., the second plate 22) while being positioned on the support plate 4. The wave spring 40 generates slide resistance in this sliding.

Figure 8B:
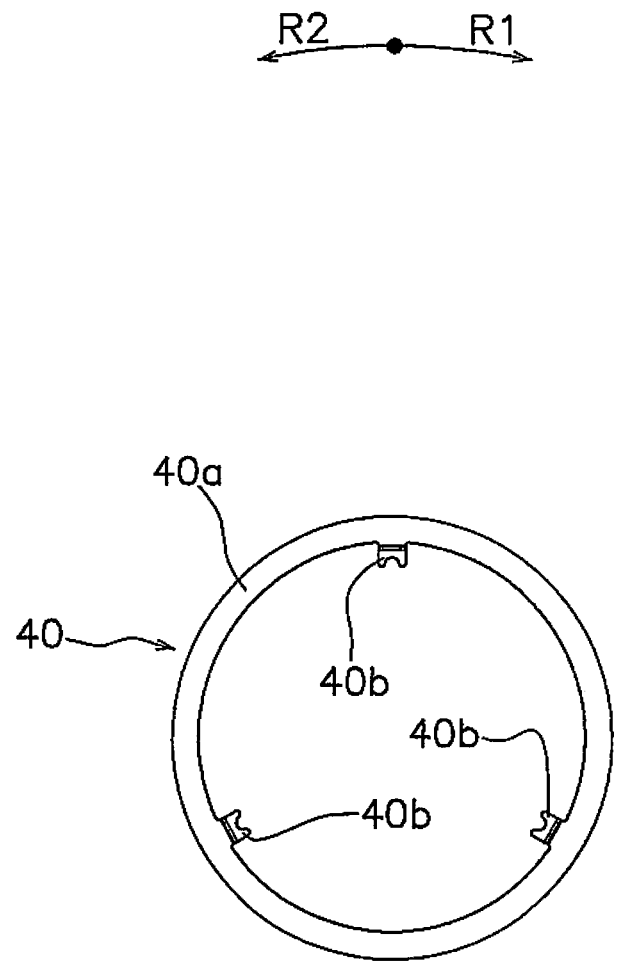
FIG. 8B is a side view of the wave spring.

As shown in FIG. 8B, the wave spring 40 has a substantially annular shape. The wave spring 40 has a spring part 40a and the restriction parts 40b. The spring part 40a contacts the input plate 2 and the support plate 4. As shown in FIG. 3A, the spring part 40a has first convex parts 44a and second convex parts 44b. In the spring part 40a, the first convex parts 44a are circumferentially aligned at predetermined intervals. The first convex parts 44a are arranged to contact the input plate 2 (e.g., the second plate 22).

In the spring part 40a, the second convex parts 44b are circumferentially aligned at predetermined intervals. Further, each second convex part 44b is located between adjacent two of the first convex parts 44a. The second convex parts 44b are arranged to contact the support plate 4.

As shown in FIG. 3A and FIG. 8A, the restriction parts 40b are engaged with the support plate 4, and thus restrict circumferential movement of the wave spring 40. Specifically, as shown in FIG. 2A, FIG. 2B, FIG. 3A and FIG. 3B, the restriction parts 40b are disposed on the inner peripheral part of the spring part 40a in the condition that the wave spring 40 is disposed axially between the input plate 2 (the second plate 22) and the support plate 4. As shown in FIG. 8B, the plurality (e.g., three) of restriction parts 40b are herein integrally formed with the inner peripheral part of the spring part 40a to be circumferentially aligned at predetermined intervals. Each restriction part 40b has a recessed shape and is engaged with each second protruding part 48 of the support part 4. Circumferential movement of the wave spring 40 is thereby restricted.

As described above, the restriction parts 40b are engaged with the support plate 4. Hence, slide resistance to be generated between the second convex parts 44b and the support plate 4 is small. Therefore, in the present flywheel assembly 1, slide resistance to be generated between the first convex parts 44a and the input plate 2 (the second plate 22) can be considered as substantive slide resistance.

<Actions of Flywheel Assembly>

Figure 4:
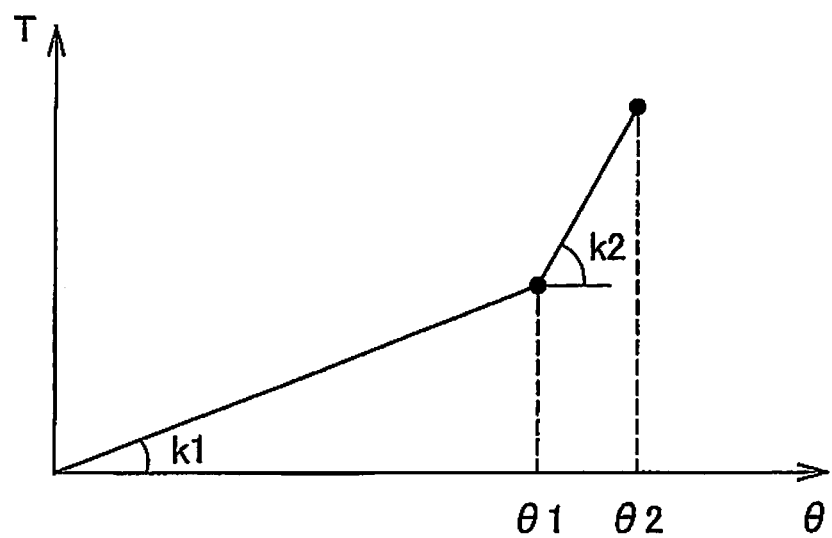
FIG. 4 is a diagram for representing torsional characteristics of the flywheel assembly.

Actions (torsional characteristics) of the flywheel assembly 1 will be explained with reference to FIG. 4. In FIG. 4, the horizontal axis indicates the torsion angle θ, whereas the vertical axis indicates torque. It should be noted that the flywheel assembly 1 according to the present exemplary embodiment includes three groups of springs 50, i.e., three pairs of the first coil spring 51 and the second coil spring 61 that are disposed in series. Each group of springs 50 is composed of the first coil spring 51 and the second coil spring 61. In the following explanation, an arbitrary pair of springs 50 will be focused for easy understanding.

<Positive-side Torsional Characteristic>

First, power of the engine is inputted into the flywheel assembly 1, and in turn, the input plate 2 begins to be rotated with respect to the output plate 3 in the first direction (the R1 direction in FIG. 1). Accordingly, the first coil spring 51 and the second coil spring 61 begin to be compressed between the input plate 2 and the output plate 3.

Then, the second coil spring 61 and the first coil spring 51 are compressed between the input plate 2 and the output plate 3 through the support plate 4. When described in detail, the second coil spring 61 is compressed between the relevant second pressing part 28 of the input plate 2 and the relevant engaging part 43 of the support plate 4 through the spring sheets. On the other hand, the first coil spring 51 is compressed between the engaging part 43 of the support plate 4 and the relevant third pressing part 34 of the output plate 3 through the spring sheets. Accordingly, a first stage torsional stiffness K1 is formed as shown in FIG. 4.

Subsequently, when the torsion angle θ increases, the shock absorber members 70 disposed inside the first coil spring 51 and the second coil spring 61 become contactable to their relevant spring sheets. At this time, the torsion angle θ is θ1. The shock absorber member 70 disposed inside the second coil spring 61 is herein compressed between the second pressing part 28 of the input plate 2 and the engaging part 43 of the support plate 4 through the spring sheets. On the other hand, the first coil spring 51 is compressed between the engaging part 43 of the support plate 4 and the third pressing part 34 of the output plate 3 through the spring sheets. Accordingly, a second stage torsional stiffness K2 is formed as shown in FIG. 4.

When the torsion angle θ further increases and reaches θ2 under the condition, the first stopper mechanism 81 and the second stopper mechanism 85 are activated.

When described in detail, on the inner peripheral side of the first coil spring 51, the relevant second contact part 42 of the support plate 4 contacts the relevant first contact part 33 of the output plate 3. Accordingly, the first coil spring 51 is deactivated. In more detail, the first coil spring 51 and the second coil spring 61 are deactivated when the second contact part 42 of the support plate 4 contacts the first contact part 33 of the output plate 3, and further, when the first protruding part 22c of the second plate 22, which is disposed on the outer peripheral side of the second coil spring 61, contacts the relevant rotation restriction part 44 of the support plate 4. This is a condition that the torsion angle θ has reached the maximum torsion angle θ2.

<Negative-side Torsional Characteristics>

Negative-side torsional characteristics are substantially the same as the positive-side torsional characteristics, and therefore, will be explained with reference to FIG. 4. Specifically, where the torsion angle θ is set as an absolute value in FIG. 4, FIG. 4 can be considered as a diagram for representing the negative-side torsional characteristics.

First, power of the engine is inputted into the flywheel assembly 1, and in turn, the input plate 2 begins to be rotated with respect to the output plate 3 in the second direction (the R2 direction in FIG. 1). Accordingly, the first coil spring 51 and the second coil spring 61 begin to be compressed between the input plate 2 and the output plate 3.

Then, the second coil spring 61 and the first coil spring 51 are compressed between the input plate 2 and the output plate 3 through the support plate 4. When described in detail, the first coil spring 51 is compressed between the relevant first pressing part 27 of the input plate 2 and the relevant engaging part 43 of the support plate 4 through the spring sheets. On the other hand, the second coil spring 61 is compressed between the engaging part 43 of the support plate 4 and the relevant third pressing part 34 of the output plate 3 through the spring sheets. Accordingly, the first stage torsional stiffness K1 is formed as shown in FIG. 4.

Subsequently, when the torsion angle θ increases, the shock absorber members 70 disposed inside the first coil spring 51 and the second coil spring 61 become contactable to their relevant spring sheets. At this time, the torsion angle θ is θ1. The second coil spring 61 is herein compressed between the engaging part 43 of the support plate 4 and the third pressing part 34 of the output plate 3 and through the spring sheets. On the other hand, the shock absorber member 70 disposed inside the first coil spring 51 is compressed between the first pressing part 27 of the input plate 2 and the engaging part 43 of the support plate 4 through the spring sheets. Accordingly, the second stage torsional stiffness K2 is formed as shown in FIG. 4.

When the torsion angle θ further increases and reaches θ2 under the condition, the first stopper mechanism 81 and the second stopper mechanism 85 are activated.

When described in detail, on the inner peripheral side of the second coil spring 61, the relevant second contact part 42 of the support plate 4 contacts the relevant first contact part 33 of the output plate 3. Accordingly, the second coil spring 61 is deactivated. In more detail, the first coil spring 51 and the second coil spring 61 are deactivated when the second contact part 42 of the support plate 4 contacts the first contact part 33 of the output plate 3, and further, when the first protruding part 22c of the second plate 22, which is disposed on the outer peripheral side of the first coil spring 51, contacts the relevant rotation restriction part 44 of the support plate 4. This is a condition that the torsion angle θ has reached the maximum torsion angle θ2.

<Features>

The present flywheel assembly 1 includes the input plate 2, the output plate 3, the plurality of coil springs 50, the support plate 4 and the wave spring 40. The input plate 2 is a member in which power of the engine is inputted. The output plate 3 is disposed to be rotatable with respect to the input plate 2. The plurality of coil springs 50 are configured to be compressed between the input plate 2 and the output plate 3. The support plate 4 is engaged with the plurality of coil springs 50 and couples the coil springs 50. The wave spring 40 is disposed axially between the input plate 2 and the support plate 4. Further, the wave spring 40 is configured to slide against the input plate 2. Yet further, the wave spring 40 is positioned on the support plate 4.

In the present flywheel assembly 1, when inputted into the input plate 2, the power of the engine is sequentially transmitted to the input plate 2, the support plate 4 and the output plate 3 in this order. In the power transmission path, the plurality of coil springs 50 are configured to be compressed between the input plate 2 and the output plate 3 through the support plate 4. Further, the wave spring 40 is configured to slide against the input plate 2 while being positioned on the support plate 4.

According to the present flywheel assembly 1, the wave spring 40 is configured to slide against the input plate 2 while being positioned on the support plate 4. Put differently, the support plate 4 generates slide resistance between itself and the input plate 2, while being restricted from circumferentially moving. Thus, the present flywheel assembly 1 can stably generate slide resistance.

In the present flywheel assembly 1, the output plate 3 has the annular part 32 and the third pressing parts 34. The annular part 32 is disposed on the inner peripheral side of the coil springs 50. The third pressing parts 34 extend radially outward from the annular part 32 and are capable of pressing the coil springs 50. Further, the support plate 4 has the annular body 41 and the engaging parts 43. The annular body 41 is disposed on the inner peripheral side of the coil springs 50. The engaging parts 43 extend radially outward from the annular body 41 and are capable of being engaged with the respective coil springs 50. Herein, the third pressing parts 34 of the output plate 3 and the engaging parts 43 of the support plate 4 are disposed to be circumferentially aligned. Yet further, the wave spring 40 is disposed axially between the input plate 2 and both of the third pressing parts 34 and the engaging parts 43.

In the present flywheel assembly 1, the wave spring 40 is positioned on the support plate 4. Thus, slide resistance can be stably generated between the wave spring 40 and the input plate 2 even when the third pressing parts 34 of the output plate 3 and the engaging parts 43 of the support plate 4 are disposed to be circumferentially aligned, and further, the wave spring 40 is disposed between the input plate 2 and both of the third pressing parts 34 and the engaging parts 43.

In the present flywheel assembly 1, the support plate 4 has the second protruding parts 48 protruding toward the input plate 2. Further, the wave spring 40 has the spring part 40*a* and the restriction parts 40*b*. The spring part 40*a* makes contact with the input plate 2 and the support plate 4. The restriction parts 40*b* are engaged with the second protruding parts 48 and restrict circumferential movement of the wave spring 40.

In the present flywheel assembly 1, the spring part 40*a* contacts the input plate 2 and the support plate 4. Thus, the support plate 4 can be axially positioned with respect to the input plate 2. Further, the restriction parts 40*b* are engaged with the second protruding parts 48 and restrict circumferential movement of the wave spring 40. Thus, slide resistance can be stably generated between the spring part 40*a* and the input plate 2.

In the present flywheel assembly 1, the spring part 40*a* has the first convex parts 44*a* and the second convex parts 44*b*. The first convex parts 44*a* contact the input plate 2. The second convex parts 44*b* are disposed circumferentially adjacent to the first convex parts 44*a* and contact the support plate 4.

In the present flywheel assembly 1, the first convex parts 44*a* of the wave spring 40 contact the input plate 2, whereas the second convex parts 44*b* of the wave spring 40 contact the support plate 4. Thus, even when the support plate 4 is axially moved due to variation in torque or so forth, the support plate 4 can be axially positioned with respect to the input plate 2 by the wave spring 40.

Further, the wave spring 40 can maintain a condition that the first convex parts 44*a* thereof always contact the input plate 2. Thus, slide resistance can be stably generated between the wave spring 40 and the input plate 2.

In the present flywheel assembly 1, the second protruding parts 48 are embossed parts formed by embossing the support plate 4.

In the present flywheel assembly 1, the second protruding parts 48 are formed by embossing. Thus, the second protruding parts 48 can be easily formed, and further, can reliably exert required stiffness.

Other Exemplary Embodiments

The present invention is not limited to the aforementioned exemplary embodiment, and a variety of changes and modifications can be made without departing from the scope of the present invention as defined in the appended claims.

The aforementioned exemplary embodiment has exemplified the construction that the restriction parts 40*b* are formed on the inner peripheral part of the spring part 40*a*. However, the restriction parts 40*b* may be formed in any position on the spring part 40*a* as long as they can be engaged with the support plate 4.

The aforementioned exemplary embodiment has exemplified the construction that the second protruding parts 48 are formed by embossing the support plate 4. However, the second protruding parts 48 may be formed by any suitable method as long as they protrude toward the input plate 2. Alternatively, the second protruding parts 48 may be formed as discrete elements provided separately from the support plate 4.

The present invention is widely applicable to damper devices.

What is claimed is:

1. A damper device, comprising:
a first rotary member into which a power of an engine is inputted;
a second rotary member disposed to be rotatable with respect to the first rotary member;
a plurality of coil springs configured to be compressed between the first rotary member and the second rotary member;
an intermediate member configured to engage the plurality of coil springs and couple the plurality of coil springs together; and
a slide spring disposed axially between the first rotary member and the intermediate member, and configured to slide against the first rotary member and configured not to slide with respect to the intermediate member, the slide spring being formed independently of the intermediate member and being positioned on the intermediate member.

2. The damper device according to claim 1, wherein
the second rotary member has a first body and a pressing part, the first body being disposed on an inner peripheral side of the plurality of coil springs, the pressing part extending radially outward from the first body and configured to press the plurality of coil springs,
the intermediate member has a second body and an engaging part, the second body being disposed on the inner peripheral side of the plurality of coil springs, the engaging part extending radially outward from the second body and configured to engage respectively with the plurality of coil springs,
the pressing part and the engaging part are disposed to be circumferentially aligned, and
the slide spring is disposed radially inward of the pressing part and the engaging part with respect to an axial position between the first rotary member and both of the pressing part and the engaging part.

3. The damper device according to claim 2, wherein
the intermediate member has a protruding part protruding toward the first rotary member, and
the slide spring has a spring part and a restriction part, the spring part being configured to contact the first rotary member and the intermediate member, the restriction part being configured to engage the protruding part and restrict circumferential movement of the slide spring.

4. The damper device according to claim 3, wherein
the slide spring is a wave spring, and
the spring part has a first convex part and a second convex part, the first convex part contacting the first rotary member, the second convex part being disposed circumferentially adjacent to the first convex part and contacting the intermediate member.

5. The damper device according to claim 1, wherein
the intermediate member has a protruding part protruding toward the first rotary member, and
the slide spring has a spring part and a restriction part, the spring part being configured to contact the first rotary member and the intermediate member, the restriction part being configured to engage the protruding part and restrict circumferential movement of the slide spring.

6. The damper device according to claim 5, wherein
the slide spring is a wave spring, and
the spring part has a first convex part and a second convex part, the first convex part contacting the first rotary member, the second convex part being disposed circumferentially adjacent to the first convex part and contacting the intermediate member.

7. The damper device according to claim 6, wherein
the protruding part is an embossed part formed by embossing the intermediate member.

8. The damper device according to claim 5, wherein
the protruding part is an embossed part formed by embossing the intermediate member.

* * * * *